J. B., C. J. & S. B. GRAY.
LOAD CONTROLLED BRAKE.
APPLICATION FILED JUNE 6, 1908.

No. 908,246.

Patented Dec. 29, 1908.
4 SHEETS—SHEET 2.

WITNESSES
John A Bergstrom
W. W. Holt

INVENTORS
Joel B. Gray
Charles J. Gray
Seymour B. Gray

BY Munn & Co.
ATTORNEYS

J. B., C. J. & S. B. GRAY.
LOAD CONTROLLED BRAKE.
APPLICATION FILED JUNE 6, 1908.
908,246.
Patented Dec. 29, 1908.
4 SHEETS—SHEET 3.
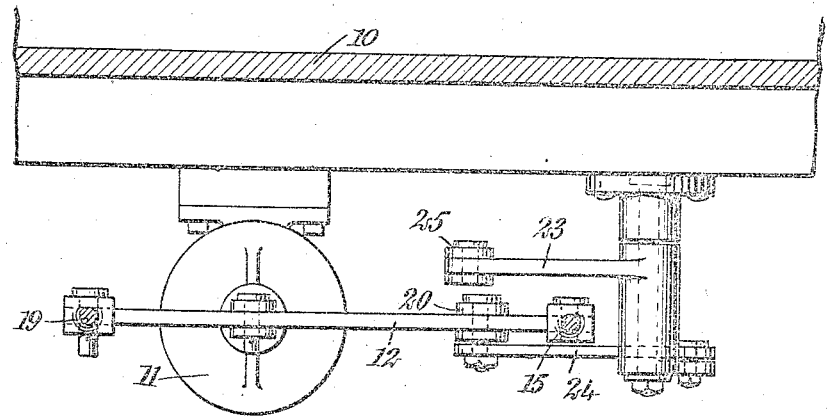
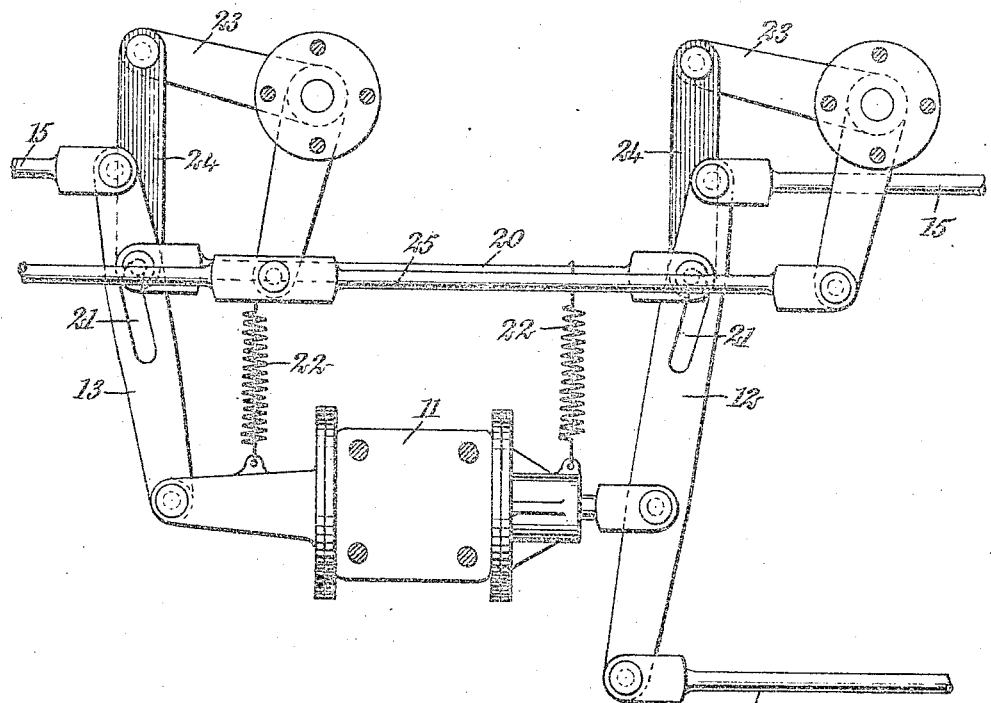
WITNESSES
Joshua Bergstrom
INVENTORS
Joel B. Gray
Charles J. Gray
Seymour B. Gray
BY
ATTORNEYS J. B., C. J. & S. B. GRAY.
LOAD CONTROLLED BRAKE.
APPLICATION FILED JUNE 6, 1908.
908,246.
Patented Dec. 29, 1908.
4 SHEETS—SHEET 4.
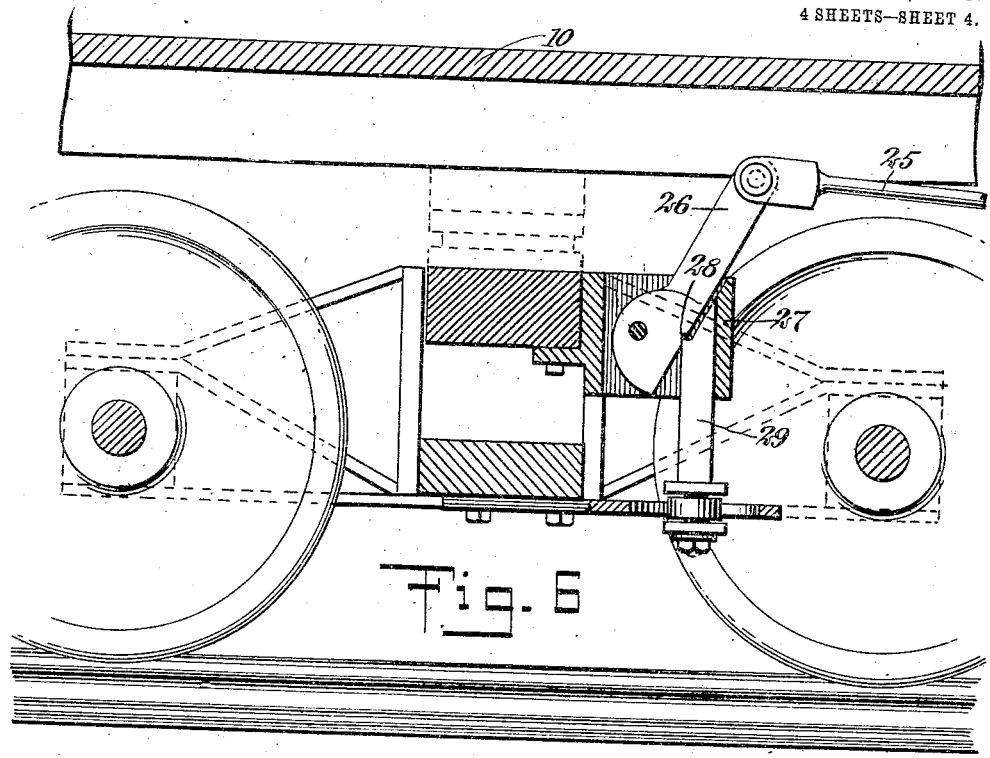
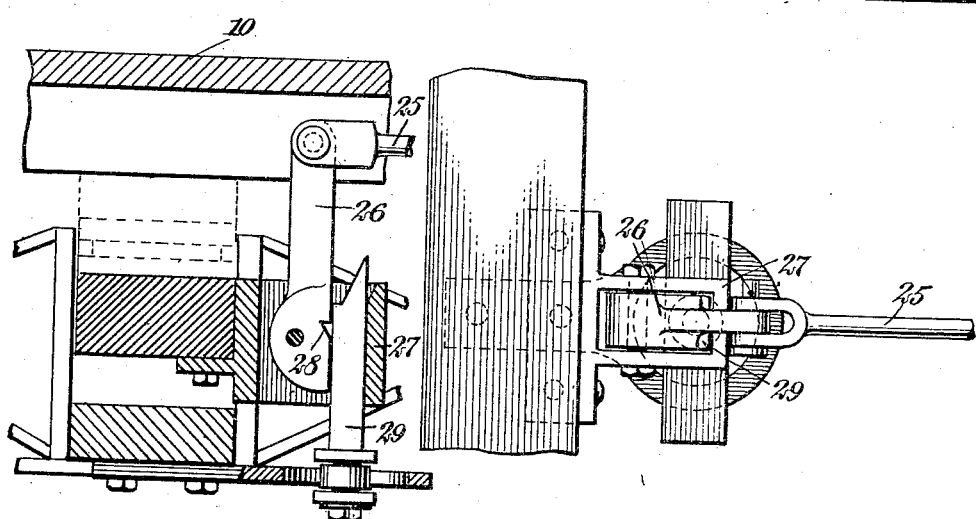
WITNESSES
INVENTORS
Joel B. Gray
Charles J. Gray
Seymour B. Gray
BY
ATTORNEYS

UNITED STATES PATENT OFFICE.

JOEL B. GRAY, CHARLES J. GRAY, AND SEYMOUR B. GRAY, OF OTTAWA, KANSAS.

LOAD-CONTROLLED BRAKE.

No. 908,246.  Specification of Letters Patent.  Patented Dec. 29, 1908.

Application filed June 6, 1908. Serial No. 437,083.

*To all whom it may concern:*

Be it known that we, JOEL B. GRAY, CHARLES J. GRAY, and SEYMOUR B. GRAY, citizens of the United States, and residents of Ottawa, in the county of Franklin and State of Kansas, have invented a new and Improved Load-Controlled Brake, of which the following is a full, clear, and exact description.

This invention is an improved brake for railway cars, having in view the provision of supplementary means for shifting the fulcrums of the braking or floating levers, to compensate for the difference in power required to check the speed or bring the car to a stop when in loaded and unloaded conditions. To this end we have constructed such a device, automatic and positive in action, which may be applied to the well-known types of brakes now in general use.

Reference is to be had to the accompanying drawings forming a part of this specification, in which similar characters of reference indicate corresponding parts in all the views.

Figure 1:
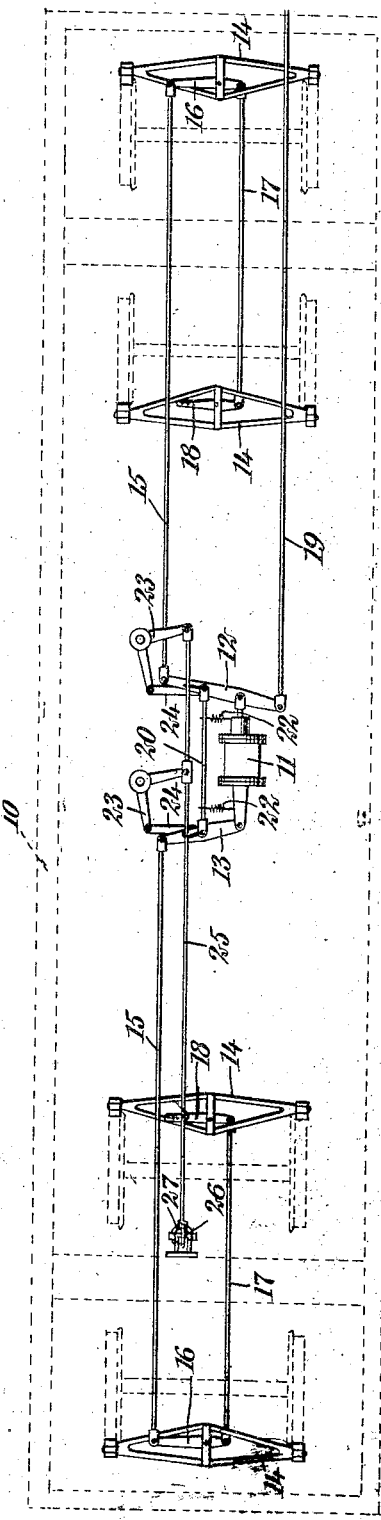
Figure 2:
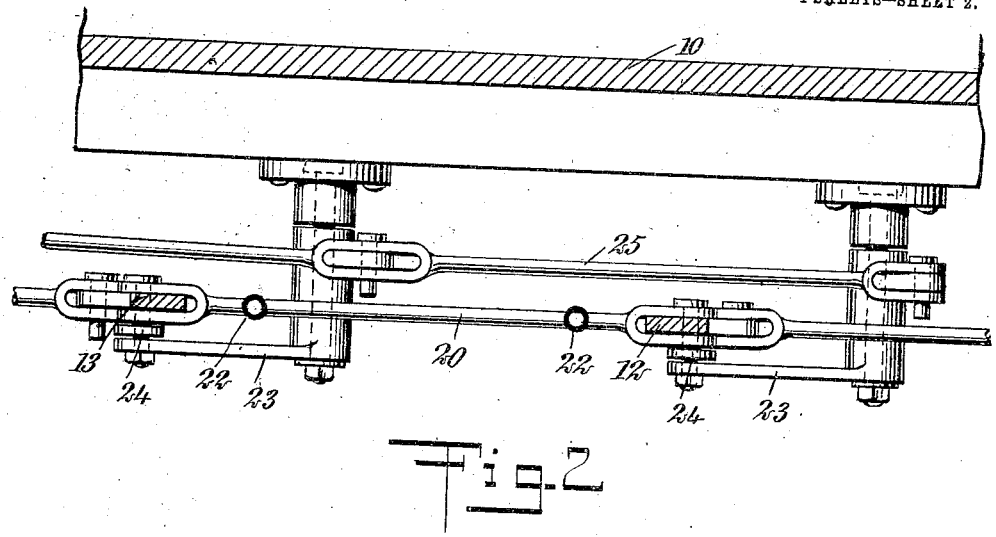
Figure 3:
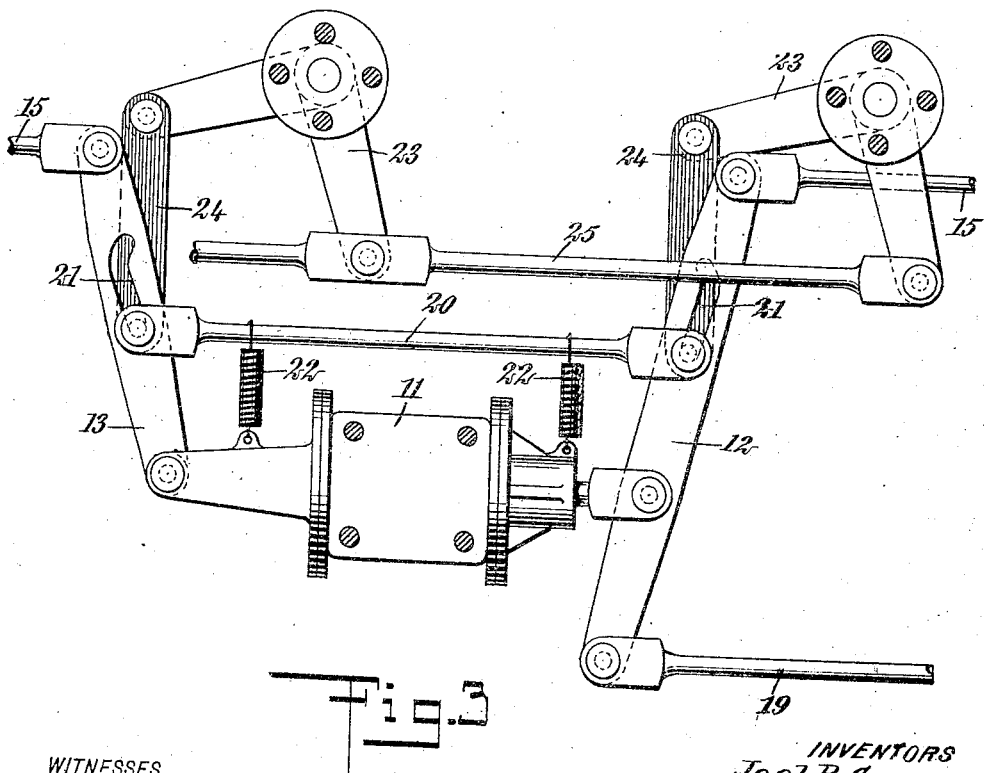

Figure 1 is a plan of a brake with our improvements applied thereto, showing the body of the car, wheels, etc. in dotted outline; Fig. 2 is a fragmentary longitudinal vertical section at one side of the brake cylinder; Fig. 3 is a horizontal section just above the brake cylinder, showing the parts in position when the brake is off and the car unloaded; Fig. 4 is a cross-section in advance of the forward end of the brake cylinder; Fig. 5 is a view similar to Fig. 3, showing the position of the parts when the brake is off and the car loaded; Fig. 6 is a section through the car truck, showing the actuating devices of our improvement in position when the car is unloaded; Fig. 7 is a plan of the said devices; and Fig. 8 is a section similar to Fig. 6, showing the position assumed by the actuating devices when the car is loaded.

In Fig. 1 we have shown a complete braking system applied to a car 10, and embodying our improvements. This braking system comprises the usual brake cylinder 11, having the floating or braking levers 12 and 13, respectively fulcrumed at opposite ends, which are connected with the brake beams 14 at the opposite ends of the car through the intermediary of connecting rods or links 15, levers 16, rods or links 17 and levers 18, the last mentioned rods and levers extending between the outer and inner brake beams. The floating lever 12 is fulcrumed to the piston of the brake cylinder and extended to one side thereof where it is connected with a rod or link 19 passing to a hand-brake, as is the usual practice.

In applying our improvements to a brake of this character, the fulcrum pins of the connecting rod 20 which extends between the floating levers 12 and 13, instead of being fixed are slidable longitudinally of these levers, for which purpose the said levers are constructed with slots 21 having inwardly offset or converging extremities, as best shown in Figs. 3 and 5. The connecting rod 20 is normally forced toward the brake cylinder by springs 22, which draws the fulcrums of the floating levers inwardly and reduces the leverage. For automatically drawing this lever from the brake cylinder to increase the leverage as the car is loaded, we provide bell-crank levers 23 pivotally supported on depending bolts or pins, these levers, as shown, being constructed with a substantial boss at the intersection of their arms to give them sufficient strength. One arm of each bell-crank lever is connected to the fulcrum of the adjacent lever by a link 24, and the other arms of the bell-crank levers are pivoted to an actuating rod or bar 25 which extends to one pair of the car trucks, as shown in Figs. 1, 6, 7 and 8, where it is pivoted to a latch 26, the latter being fulcrumed within a vertically slotted casting 27 and constructed with a notch 28 on its working face designed to engage, when the car is unloaded, on the corner or shoulder of a post or projection 29, the post being carried on a fixed portion of the truck, and the casting 27 on which the latch is formed being attached to the yielding bolster. With the car unloaded, the latch 26 will be in the position shown in Fig. 6, and the connecting rod will be in the position shown in Fig. 3. When the car is loaded, the truck bolster will be depressed, forcing the latch 26 against the post or projection 29, which, by reason of the inclined or cam face of the latter, will cause the latch to assume an approximately vertical position and pass to the side of the post, as illustrated in Fig. 8, thus drawing the actuating bar 25 forward, and through the action of the bell-crank levers 23 and links 24, drawing the fulcrum pins and connecting rod 20 outwardly against the tension of the springs 22 to the position shown in Fig. 4, thus increasing the leverage of the brake cylinder and thereby augmenting the braking action. When the car is again unloaded, the truck bolster will rise and release the latch from the post, at which time the springs of the connecting rod will return the intermediate mechanism to initial position.

Having thus described our invention, we claim as new and desire to secure by Letters Patent:

1. The combination of a truck, a brake cylinder, braking levers connected to the cylinder, means normally tending to draw the fulcrums of the levers in one direction, and means connected to relatively movable portions of the truck for moving the fulcrums of the levers in the opposite direction against the tension of said means.

2. The combination of a brake cylinder, a truck having a yielding bolster, slotted braking levers pivotally supported on the cylinder, a connecting rod having fulcrum pins slidable in the slots of the levers, springs tending to draw the connecting rod toward the cylinder, bell-crank levers, an actuating bar connected to one arm of each bell-crank lever, links connecting the other arms of the bell-crank levers with the fulcrum pins, a latch pivoted to the actuating bar and fulcrumed on the yielding truck bolster, and a post for engaging the latch and moving said bar when the truck bolster is depressed.

3. The combination of a braking mechanism, a truck, braking levers, a latch fulcrumed on a yielding part of the truck, operatively connected with the fulcrums of the levers, and means carried by the truck for swinging said latch on its fulcrum and shifting the fulcrums of the levers when the said yielding part of the truck is depressed.

4. The combination of a braking mechanism having braking levers, a truck, bell-crank levers respectively connected to the fulcrums of the braking levers, a latch fulcrumed on the yielding portion of the truck, an actuating bar connected to the latch and bell-crank levers, and means carried by a fixed part of the truck for swinging the latch in a direction to increase the leverage of the braking levers when the yielding part of the truck is depressed.

5. In combination with a car, braking means therefor including floating levers, bell-crank levers, each having an arm connected with the fulcrum of one of the floating levers, a bar connected to the other arms of the levers, and means controlled by the load of the car for actuating said bar to shift the fulcrums of the floating levers.

6. The combination of a car having a yielding truck member through which the car load is transmitted and a relatively fixed truck member, braking means for the car, having levers, and coöperating devices for shifting the fulcrums of said levers, respectively connected to said members.

In testimony whereof we have signed our names to this specification in the presence of two subscribing witnesses.

JOEL B. GRAY.
CHARLES J. GRAY.
SEYMOUR B. GRAY.

Witnesses:
H. H. HAYES,
F. C. DOBSON.